Patented May 5, 1942

2,281,715

UNITED STATES PATENT OFFICE 2,281,715

PROCESS FOR THE PRODUCTION OF SODIUM FORMATE

Donald Atwater Rogers, Petersburg, Va., assignor to The Solvay Process Company, New York, N. Y., a corporation of New York No Drawing. Application July 3, 1940, Serial No. 343,767

8 Claims. (Cl. 260—542)

This invention relates to a process for the production of sodium formate and particularly to a process for producing a substantially anhydrous sodium formate.

It is known to produce sodium formate by treating a solution of caustic soda with gas containing carbon monoxide at high temperatures and pressures. From the resulting solution wet crystals of sodium formate may be recovered by boiling water from the solution. Wet crystals filtered from the mother liquor are then warmed to dry them.

It is an object of this invention to provide a process for the production of sodium formate whereby solid formate may be obtained without the necessity of boiling a sodium formate solution to evaporate it and crystallize solid therefrom. It is a further object of this invention to provide a process whereby substantially anhydrous sodium formate may be produced from caustic soda solutions, preferably in a continuously operable process, and the removal of the water introduced in the caustic soda solution and the production of dry sodium formate be accomplished in a particularly efficacious, economical manner.

If one attempts to minimize the amount of water introduced with the caustic soda solution treated with carbon monoxide to produce sodium formate, either extremely high temperatures must be maintained or, as the materials react, solid caustic soda rather than sodium formate will be deposited from the solution. This solid becomes coated with sodium formate and its reaction with the carbon monoxide hindered. Purification of sodium formate containing solid caustic soda coated with formate is difficult.

I have discovered that by reacting carbon monoxide gas with a solution containing caustic soda and sodium formate in proportions such that the molecular ratio of caustic soda to the formate does not substantially exceed 1 to 1, sodium formate may be produced and simultaneously crystallized from the solution to give a slurry of solid sodium formate instead of caustic soda first crystallizing from the solution.

I have found sodium formate may be produced with particular advantages in large scale commercial operation by treating a caustic soda solution, preferably at temperatures not above 200 C., with carbon monoxide gas first under conditions such that the amount of water present is sufficient to retain in solution all of the caustic soda present until the solution contains no more caustic soda than corresponds to equal molecular proportions of caustic soda and sodium formate. Thereafter the treatment of the solution with carbon monoxide is continued under conditions such that water is vaporized into the carbon monoxide gas and thereby removed from the solution and solid sodium formate crystallizes from the solution simultaneously with the continued reaction of the carbon monoxide with the caustic soda in solution. The rate of evaporation of water from the slurry of sodium formate in caustic soda solution in this stage of the process is such that the slurry always contains sufficient water to retain in solution the caustic soda as it is reacted with the carbon monoxide.

I have discovered wet, solid sodium formate of this slurry may be economically converted into substantially anhydrous sodium formate by introducing the wet solid, accompanied by not more than 30% water, into a pool of molten anhydrous sodium formate maintained at a temperature not substantially above 300 C., preferably at 260 C. to 300 C. As the wet, solid formate is introduced into this pool of hot, molten material the water contained in the wet solid is flashed off as steam. Substantially anhydrous molten sodium formate is withdrawn from the pool and solidified in any desired manner. I have discovered that by maintaining the pool of molten sodium formate at a temperature not higher than 300 C., the water in the wet solid introduced to the pool may be evaporated without substantial decomposition of the molten sodium formate at temperatures sufficiently high to dehydrate rapidly the wet material.

In producing dry sodium formate from the slurry formed in the first step of my process, a slurry containing no more than 30% water may be produced directly by the treatment of caustic soda solution with carbon monoxide and this slurry may be introduced into the pool of molten formate. In operating in this manner the product will, of course, contain any caustic soda unreacted with the carbon monoxide and remaining in the slurry. If desired, the slurry of sodium formate in caustic soda solution treated with carbon monoxide may contain more than 30% water. Such a slurry may be allowed to settle and the portion containing 30% or less water introduced into molten formate to evaporate the water. The other portion, high in water, may be recirculated into contact with the carbon monoxide gas. If it is desired to produce a product which is substantially free from caustic soda, solid sodium formate may be filtered from the slurry, washed with water, and the resulting purified, wet, solid sodium formate introduced into the pool of molten formate. The wash water from purifying the formate may be introduced into the caustic soda solution contacted with the carbon monoxide gas and the caustic soda and sodium formate contained in this wash water thus kept in the process for ultimate recovery of the sodium formate and conversion of caustic soda into sodium formate. At the same time the water thus introduced into the caustic soda solution will aid in maintaining the caustic soda in solution during the initial treatment of the solution with the carbon monoxide.

The water required for maintaining the caustic soda and sodium formate in solution during the initial treatment of the caustic soda solution with carbon monoxide may be supplied either by using a dilute caustic soda solution or when a relatively concentrated caustic soda solution is used, by supplying water to the process. The amount of water supplied will depend, of course, upon the particular conditions under which the caustic soda and carbon monoxide gas are contacted. For example, if a relatively dilute carbon monoxide gas is used, the amount of unabsorbed gas passing in contact with the solution at the elevated temperatures will carry out of the solution much greater quantities of water than if a concentrated carbon monoxide gas is contacted with the solution. Similarly, in the latter stages of reacting the caustic soda and carbon monoxide the quantity of water evaporated from the solution by contact with the gas will depend both upon the temperature and the amount of unabsorbed gases contacted with the aqueous reaction mixture. In any case, however, the quantity of water maintained in the solution in the initial stage of reaction is sufficient to retain in solution all of the caustic soda and in the latter stage of reaction the amount of water evaporated in passing the carbon monoxide gas in contact with the solution is sufficient to produce the above described slurry of sodium formate.

The following example is illustrative of my invention but the invention is not limited thereto:

A 70% solution of caustic soda is introduced into the first of a series of reaction towers and is progressively advanced through each tower of the series. In each tower the solution is intimately contacted with a gas containing 4.25% CO, the remainder principally nitrogen and hydrogen, at 150° C. and under a pressure of 425 pounds per square inch gauge. The carbon monoxide gas is divided into a plurality of portions corresponding to the number of reaction towers and one portion of the gas is passed through each of the towers. From the last tower of the series a slurry of sodium formate containing 15% water is withdrawn. For every 54 pounds of water introduced in the 70% caustic soda solution supplied to this system, about 189 pounds of water vapor are carried out of the system in the gases unabsorbed by the solution and about 37 pounds in the formate slurry withdrawn from the last tower. Accordingly, 172 pounds of water is supplied in addition to that contained in the caustic soda solution. This water is supplied by introducing to one of the early towers of the series the wash water obtained in washing sodium formate crystals as described below and additional water from an outside source.

The slurry of sodium formate withdrawn from the last tower of the series is filtered or otherwise treated to separate mother liquor from the crystals. The crystals are then washed with water to remove mother liquor adhering thereto and the wash water together with the mother liquor originally separated from the crystals is returned and mixed with the caustic soda solution treated with the carbon monoxide gas. The wet, washed crystals are introduced into a pool of molten, substantially anhydrous sodium formate mantained at 260° C. to 300° C. The water in the wet solid is flashed off and anhydrous molten formate is withdrawn from the pool and solidified.

The above process may be modified in numerous manners. For example, water to keep the caustic soda in solution in the initial stages of the reaction may be supplied by using a more dilute caustic soda solution than the 70% solution of the example. Water may be condensed from the unabsorbed gases leaving contact with the caustic soda liquor and returned into the reaction liquor. The amount of water supplied to the process may be minimized by introducing into contact with the caustic soda solution in its initial stage of reaction a carbon monoxide gas containing substantial quantities of water vapor. The more concentrated the carbon monoxide gas, the smaller will be the amount of unabsorbed gas which will pass out of contact with the caustic soda solution and thus the smaller will be the quantity of water evaporated from the solution which must be supplied to keep the caustic soda in solution in the initial reaction stage. On the other hand, when the ratio of caustic soda to sodium formate is 1 to 1 or smaller, treatment of the solution with a dilute carbon monoxide gas will promote vaporization of water and production of the desired formate slurry.

The amount of water left in the formate slurry withdrawn from the last stage of the reaction will vary according to the temperature maintained. In general, for a temperature of 100° C. the slurry should contain 16% to 30% water. For a temperature of 150° C. the slurry should contain 12% to 22% water. For a temperature of 200° C. it should contain 7% to 13% water.

The reaction of carbon monoxide and caustic soda solution may be carried out in a single tower through which the solution is passed in one direction countercurrent to the carbon monoxide gas. When a plurality of towers is employed, as in the above example, both the carbon monoxide gas and the caustic soda solution may be passed in series through the towers.

The process of this invention is particularly advantageous as a method for the large scale commercial production of sodium formate inasmuch as it readily lends itself to continuous operation, although it is obvious that if desired the process may be operated as a batch procedure. In that case, both the initial and final stages of treatment of the caustic soda solution with carbon monoxide may be carried out in one and the same vessel.

The procedure for reacting a solution of caustic soda and carbon monoxide to produce a slurry of sodium formate and dehydrating the wet, solid of the slurry by introducing it into a hot melt of sodium formate is particularly adapted to commercial production. The process for producing a slurry of sodium formate of this invention may be used effectively, however, even though other methods are employed for transforming the solid formate of that slurry into a substantially anhydrous product.

I claim:

1. The process for the production of sodium formate which comprises reacting carbon monoxide gas with a solution of caustic soda which also contains sodium formate in amount such that the molecular ratio of caustic soda to sodium formate is not substantially above 1 to 1 and simultaneously vaporizing water from the solution into said gas and thereby removing water from the solution in amount sufficient to crystallize sodium formate therefrom and form a slurry of sodium formate and insufficient to crystallize caustic soda from the solution.

2. The process for the production of sodium formate which comprises contacting a solution of caustic soda with carbon monoxide gas and thereby reacting caustic soda with carbon monoxide to form said formate, said solution containing a molecular ratio of caustic soda to sodium formate above 1 to 1, continuing to react the carbon monoxide with the caustic soda until the molecular ratio of caustic soda to sodium formate in the solution does not substantially exceed 1 to 1 while maintaining in the solution sufficient water to retain in solution the caustic soda and sodium formate present, and thereafter passing a carbon monoxide gas in contact with the caustic soda solution under conditions such that water is vaporized from the solution into the carbon monoxide gas and is thereby removed from the solution in amount sufficient to form a slurry of sodium formate and insufficient to crystallize caustic soda from the solution.

3. The process for the production of sodium formate which comprises continuously flowing caustic soda solution in contact with a gas containing carbon monoxide at temperatures of 100° to 200° C. and reacting said caustic soda and carbon monoxide to form sodium formate, said solution, when initially contacted with the gas containing carbon monoxide, containing more than 1 mol of caustic soda for every 1 mol of sodium formate present in the solution maintaining in said solution until the molecular ratio of caustic soda to sodium formate therein does not substantially exceed 1 to 1, sufficient water to retain in solution the caustic soda and sodium formate, continuing to react the caustic soda and carbon monoxide until the molecular ratio of caustic soda to sodium formate is below 1 to 1, evaporating into said carbon monoxide gas water from the solution contacted therewith in which said ratio does not substantially exceed 1 to 1, the water being evaporated and removed from the solution in amount sufficient to produce a slurry of solid sodium formate containing not more than 30% water and insufficient to crystallize caustic soda from the solution, and withdrawing said slurry from contact with said carbon monoxide gas.

4. The process for the production of sodium formate which comprises reacting carbon monoxide gas with caustic soda in a solution containing sodium formate in which the molecular ratio of caustic soda to sodium formate is not substantially above 1 to 1, vaporizing water from the solution into said gas and thereby removing water from the solution to crystallize sodium formate therefrom and form a slurry of sodium formate while retaining the caustic soda in solution, maintaining a pool of molten substantially anhydrous sodium formate at a temperature of 260° C. to 300° C., introducing into said pool moist, solid sodium formate of the aforesaid slurry accompanied by no more than 30% water, and thereby evaporating the water from said moist solid and producing substantially anhydrous sodium formate.

5. The process for the production of substantially anhydrous sodium formate which comprises contacting a solution of caustic soda with carbon monoxide gas until the molecular ratio of caustic soda to sodium formate in the solution does not substantially exceed 1 to 1 while maintaining in the solution sufficient water to retain in solution the caustic soda present, thereafter continuing to treat the caustic soda solution with carbon monoxide under conditions such that water is vaporized from the solution into the carbon monoxide gas and is thereby removed from the solution and a slurry of sodium formate containing not more than 30% water is formed while retaining the caustic soda in solution, maintaining a pool of molten substantially anhydrous sodium formate at a temperature of 260° C. to 300° C., introducing into said pool moist, solid sodium formate of the aforesaid slurry accompanied by no more than 30% water and thereby evaporating the water from said moist solid and producing substantially anhydrous sodium formate.

6. The process for the production of substantially anhydrous sodium formate which comprises continuously flowing caustic soda solution in contact with a gas containing carbon monoxide at temperatures of 100° to 200° C. and reacting said caustic soda and carbon monoxide to form sodium formate, maintaining in said solution, until the molecular ratio of caustic soda to sodium formate therein does not substantially exceed 1 to 1, sufficient water to retain in solution the caustic soda, thereafter evaporating and removing water from the solution by contact with said carbon monoxide gas, the water being removed in amount sufficient to produce a slurry containing solid sodium formate and not more than 30% water while retaining the caustic soda in solution, separating solid sodium formate from mother liquor in the slurry, washing the separated solid with water, and introducing the washed solid wet with no more than 30% water into a pool of molten substantially anhydrous sodium formate maintained at a temperature of 260° to 300° C. and thereby vaporizing the water wetting the solid.

7. The process for the production of substantially anhydrous sodium formate which comprises continuously flowing caustic soda solution in contact with a gas containing carbon monoxide at temperatures of 100° to 200° C. and reacting said caustic soda and carbon monoxide to form sodium formate, maintaining in said solution, until the molecular ratio of caustic soda to sodium formate therein does not substantially exceed 1 to 1, sufficient water to retain in solution the caustic soda, thereafter evaporating and removing water from the solution by contact with said carbon monoxide gas, the water being removed in amount sufficient to produce a slurry containing solid sodium formate and not more than 30% water while retaining the caustic soda in solution, separating solid sodium formate from mother liquor in the slurry, washing the separated solid with water, recirculating said mother liquor and the solution formed in washing said solid with water, together with additional caustic soda, into contact with said carbon monoxide gas, and introducing the washed solid wet with no more than 30% water into a pool of molten substantially anhydrous sodium formate maintained at a temperature of 260° to 300° C. and thereby vaporizing the water wetting the solid.

8. The process for the production of sodium formate which comprises contacting a solution of caustic soda with carbon monoxide gas to form sodium formate, evaporating water from the solution containing sodium formate in amount sufficient to form a slurry of sodium formate, separating solid sodium formate from mother liquor in the slurry, recirculating the separated mother liquor containing sodium formate together with additional caustic soda into contact with said carbon monoxide gas and while contacting the carbon monoxide gas with the caustic soda solution containing sodium formate, vaporizing water into the carbon monoxide gas from solution contacted therewith in which the ratio of caustic soda to sodium formate is not substantially above 1 to 1, thereby removing water from the solution in amount sufficient to crystallize sodium formate therefrom but insufficient to crystallize caustic soda from the solution.

DONALD ATWATER ROGERS.